(12) United States Patent
Kuhn et al.

(10) Patent No.: US 12,362,572 B2
(45) Date of Patent: Jul. 15, 2025

(54) SYSTEMS AND METHODS FOR PHOTOVOLTAIC PRODUCTION CURTAILMENT AND AUTONOMOUS LOAD BREAKING

(71) Applicant: Unirac, Inc., Albuquerque, NM (US)

(72) Inventors: Brian Kuhn, Austin, TX (US); Sandeep Narla, Newark, CA (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/668,797

(22) Filed: May 20, 2024

(65) Prior Publication Data

US 2024/0305108 A1    Sep. 12, 2024

Related U.S. Application Data

(62) Division of application No. 17/587,482, filed on Jan. 28, 2022, now Pat. No. 12,021,388.

(60) Provisional application No. 63/144,256, filed on Feb. 1, 2021.

(51) Int. Cl.
| | |
|---|---|
| *H02J 3/32* | (2006.01) |
| *H02J 3/14* | (2006.01) |
| *H02J 3/38* | (2006.01) |
| *H02J 9/06* | (2006.01) |

(52) U.S. Cl.
CPC ............. *H02J 3/381* (2013.01); *H02J 3/14* (2013.01); *H02J 3/32* (2013.01); *H02J 9/06* (2013.01); *H02J 2300/24* (2020.01)

(58) Field of Classification Search
CPC ...... H02J 3/381; H02J 3/14; H02J 3/32; H02J 9/06; H02J 2300/24
USPC .......................................................... 307/19
See application file for complete search history.

(56) References Cited

U.S. PATENT DOCUMENTS

| | | |
|---|---|---|
| 10,135,251 B2 | 11/2018 | Berard |
| 11,522,365 B1 | 12/2022 | Cooper |
| 2016/0190810 A1 | 6/2016 | Bhavaraju et al. |
| 2018/0048159 A1 | 2/2018 | Narla et al. |
| 2020/0336003 A1* | 10/2020 | Narla ...................... H02J 7/007 |

* cited by examiner

*Primary Examiner* — Michael R. Fin
(74) *Attorney, Agent, or Firm* — Knobbe, Martens, Olson & Bear, LLP

(57) ABSTRACT

The present disclosure provides curtailing photovoltaic (PV) power output and autonomous load breaking in a backup mode of an electrical system. The electrical system includes a PV system, an energy storage system having a storage converter, and an energy control system. The energy control system is electrically coupled to the PV system, the energy storage system, and a plurality of backup loads. The electrical system includes an autonomous load breaker electrically coupled to a first backup load. When the energy control system switches from an on-grid mode to the backup mode, the storage converter adjusts the frequency of the power supplied to the backup side of the energy control system to a setpoint frequency that curtails PV power output, and the autonomous load breaker electrically disconnects the first backup load from the energy control system.

20 Claims, 8 Drawing Sheets

SYSTEMS AND METHODS FOR PHOTOVOLTAIC PRODUCTION CURTAILMENT AND AUTONOMOUS LOAD BREAKING

CROSS-REFERENCE TO RELATED APPLICATIONS AND INCORPORATION BY REFERENCE

This application is a divisional application of U.S. patent application Ser. No. 17/587,482, filed Jan. 28, 2022, which claims priority to U.S. Provisional Patent Application No. 63/144,256 filed on Feb. 1, 2021, which are all incorporated by reference herein in their entirety for all purposes.

FIELD

The present disclosure relates to systems and methods for curtailing photovoltaic (PV) power output and autonomous (e.g., large) load breaking in backup mode of an electrical system.

BACKGROUND

Existing backup power supply systems, such as PV systems, for commercial buildings or residential homes typically include storage systems (e.g., a combination of batteries and an inverter) to store energy when PV power output exceeds load demand and to provide energy when PV power output cannot match load demand during microgrid operation. Inverters for storage systems convert the direct current (DC) power discharged by the batteries into alternating current (AC) power that is synchronized with the utility grid (on-grid) or act as a micro-grid to synchronize with the PV inverters in backup operation.

One limitation of existing backup power supply systems when operating off-grid is effectively curtailing PV power output such that the PV power output does not exceed the storage capacity of the energy storage system. One approach for minimizing the risk of over-generating to the backup side of the energy control system beyond capacity is moving some PV panels to a non-backup side of the electrical system. But locating PV panels on the non-backup side reduces the total power output capacity of the backup PV power supply, thereby inhibiting the backup power supply system from meeting high load demands.

Smart storage inverters (e.g., that comply to UL1741 SA, IEEE 1547-2018, or similar standards) have the ability to curtail the generation output of backup PV generation systems using smart inverter features such as frequency-watt or volt-watt to match available storage system capability dynamically. However, when the backup side PV system size is proportionately high, the existing storage inverters do not curtail PV generation output quickly using frequency-watt control, and therefore, lack the capability to proactively reduce PV power output to prevent over-generating the AC bus of the storage system.

Another limitation is that large loads, such as air conditioners, electric vehicle chargers, pool pumps, range ovens, etc., are typically not wired to the backup side of the electrical system because large loads tend to drain the storage system rapidly or overload the AC bus of the storage system during microgrid operation. These large loads sometimes can be located far downstream from the main service panel of the local electrical system, such as in a detached garage, where an additional load subpanel is usually installed to provide smart circuit breakers for these large loads, as wiring these large loads to the non-backup side of an electrical system is laborious and expensive.

BRIEF SUMMARY

Accordingly, there is a need, for example, for systems and procedures that effectively prevent PV power output exceeding the absorption/charge capacity of the energy storage system during the backup mode of operation. And there is a need, for example, for systems and procedures to allow large loads (e.g., 50 amps or greater) to be connected to the backup side of an electrical system without posing the risk of AC overload or quickly draining the storage system during the backup mode.

In some embodiments, the present disclosure provides an electrical system. In some embodiments, the electrical system includes an energy control system electrically coupled to a plurality of backup loads including a first (e.g., large) backup load. In some embodiments, the electrical system includes a photovoltaic (PV) power generation system electrically coupled to the energy control system. In some embodiments, the PV power generation system is configured to generate and supply power. In some embodiments, the electrical system includes an energy storage system electrically coupled to the energy control system. In some embodiments, the energy storage system is configured to store power supplied by the PV power generation system and discharge stored power to the energy control system. In some embodiments, the electrical system includes an autonomous smart load breaker electrically coupled to the first (e.g., large) backup load. In some embodiments, the energy control system is configured to operate in an on-grid mode electrically connecting the PV power generation system to the utility grid and a backup mode electrically disconnecting the PV power generation system and the plurality of loads from a utility grid. In some embodiments, the autonomous smart load breaker is configured to maintain electrical connection of the first (e.g., large) backup load to the energy control system when the energy control system is in the on-grid mode and to electrically disconnect the first (e.g., large) backup load from the energy control system when the energy control system is in the backup mode.

In some embodiments, the autonomous smart load breaker includes a switch and a microcontroller configured to operate the switch. In some embodiments, the autonomous smart load breaker includes an electro-mechanical relay. In some embodiments, the autonomous load breaker includes a solid-state switch.

In some embodiments, the autonomous smart load breaker includes measurement circuitry configured to detect at least one of AC voltage, frequency, and current. In some embodiments, the autonomous smart load breaker is configured to determine whether to disconnect the first (e.g., large) backup load from the energy control system based on the detected AC voltage, frequency, or current. In some embodiments, the autonomous smart load breaker is configured to compare the detected AC voltage, frequency, and/or current according to a predetermined threshold to determine whether to disconnect the first (e.g., large) backup load.

In some embodiments, the present disclosure provides an electrical system. In some embodiments, an energy control system having a non-backup side electrically coupled a utility grid and a backup side electrically coupled to a plurality of backup loads. In some embodiments, a photovoltaic (PV) power generation system electrically coupled to the backup side of the energy control system. In some embodiments, the PV power generation system is configured to generate and supply power to the backup side of the energy control system. In some embodiments, an energy storage system is electrically coupled to the energy control system. In some embodiments, the energy storage system includes a battery and a storage inverter. In some embodiments, the battery is configured to store power supplied by the PV power generation system and discharge stored power to the backup side of the energy control system. In some embodiments, the storage inverter is configured to adjust a (e.g., AC operating) frequency of the power supplied to the backup side of the energy control system to a nominal grid frequency in a first frequency range to allow a maximum PV power output and to a setpoint frequency in a second frequency range to curtail PV power output. In some embodiments, the setpoint frequency is greater than the grid frequency. In some embodiments, the energy control system is configured operate in an on-grid mode electrically connecting the PV power generation system to the utility grid and a backup mode electrically disconnecting the PV power generation system and the plurality of backup loads from the utility grid. In some embodiments, the storage inverter is configured to adjust the frequency of the power supplied to the backup side of the energy control system to the setpoint frequency when the energy control system switches from the on-grid mode to the backup mode.

In some embodiments, the storage inverter is configured to adjust the frequency of the power supplied to the backup side of energy control system (e.g., microgrid) to the nominal grid frequency when the energy control system switches from the backup mode to the on-grid mode. In some embodiments, the first frequency range is from approximately 59.3 Hz to approximately 60.5 Hz, and the second frequency range is from approximately 60.5 Hz to approximately 62 Hz.

In some embodiments, the plurality of backup loads includes a first (e.g., large) backup load. In some embodiments, the electrical system further includes an autonomous smart load breaker electrically coupled to the first backup load and configured to detect the frequency of the power supplied to the first backup load. In some embodiments, the autonomous smart load breaker is configured to maintain electrical connection of the first backup load to the energy control system when detecting that the frequency of the power supplied to the first backup load is in the first frequency range and to electrically disconnect the first backup load from the energy control system when detecting that the frequency of the power supplied to the first backup load is in the second frequency range.

In some embodiments, the present disclosure provides methods for controlling an electrical system having a photovoltaic (PV) power generation system, an energy storage system having a storage converter, and an energy control system, the energy control system electrically coupled to the PV power generation system, the energy storage system, and a plurality of loads. In some embodiments, the method includes a step of receiving electronic data from the electrical system. In some embodiments, the method includes a step of determining whether the electronic data indicates that the energy control system has switched from an on-grid mode to a backup mode. In some embodiments, the method includes a step of adjusting the frequency of power supplied to a backup side of the energy control system to a setpoint frequency when determining that the energy control system has switched from the on-grid mode to the backup mode. In some embodiments, the frequency of power supplied to the backup side of the energy control system is set to a nominal grid frequency when the energy control system is in the on-grid mode. In some embodiments, the setpoint frequency is greater than the nominal grid frequency.

In some embodiments, the supplied power set at the nominal grid frequency is maintained at a first power output, and the supplied power set at the setpoint frequency is maintained at a second power output that is less than the first power output. In some embodiments, the nominal grid frequency is in a first frequency range from approximately 59.3 Hz to approximately 60.5 Hz, and the setpoint frequency is in a second frequency range from approximately 60.5 Hz to approximately 62 Hz.

In some embodiments, the setpoint frequency is determined based on the difference between a maximum power output of the backup power generation system and a charging capacity of the energy storage system.

In some embodiments, the step of receiving the electronic data includes monitoring, by a controller of the storage converter, the frequency of power supplied to the energy storage system. In some embodiments, the step of determining whether the electronic data indicates that the energy control system has switched from the on-grid mode to the backup mode is based on the monitored frequency of the power supplied to the energy storage system.

In some embodiments, the steps of determining whether the electronic data indicates that the energy control system has switched from the on-grid mode to the backup mode, and adjusting the frequency of the supplied power to the setpoint frequency are executed by a controller of the storage converter.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

Figure 1:
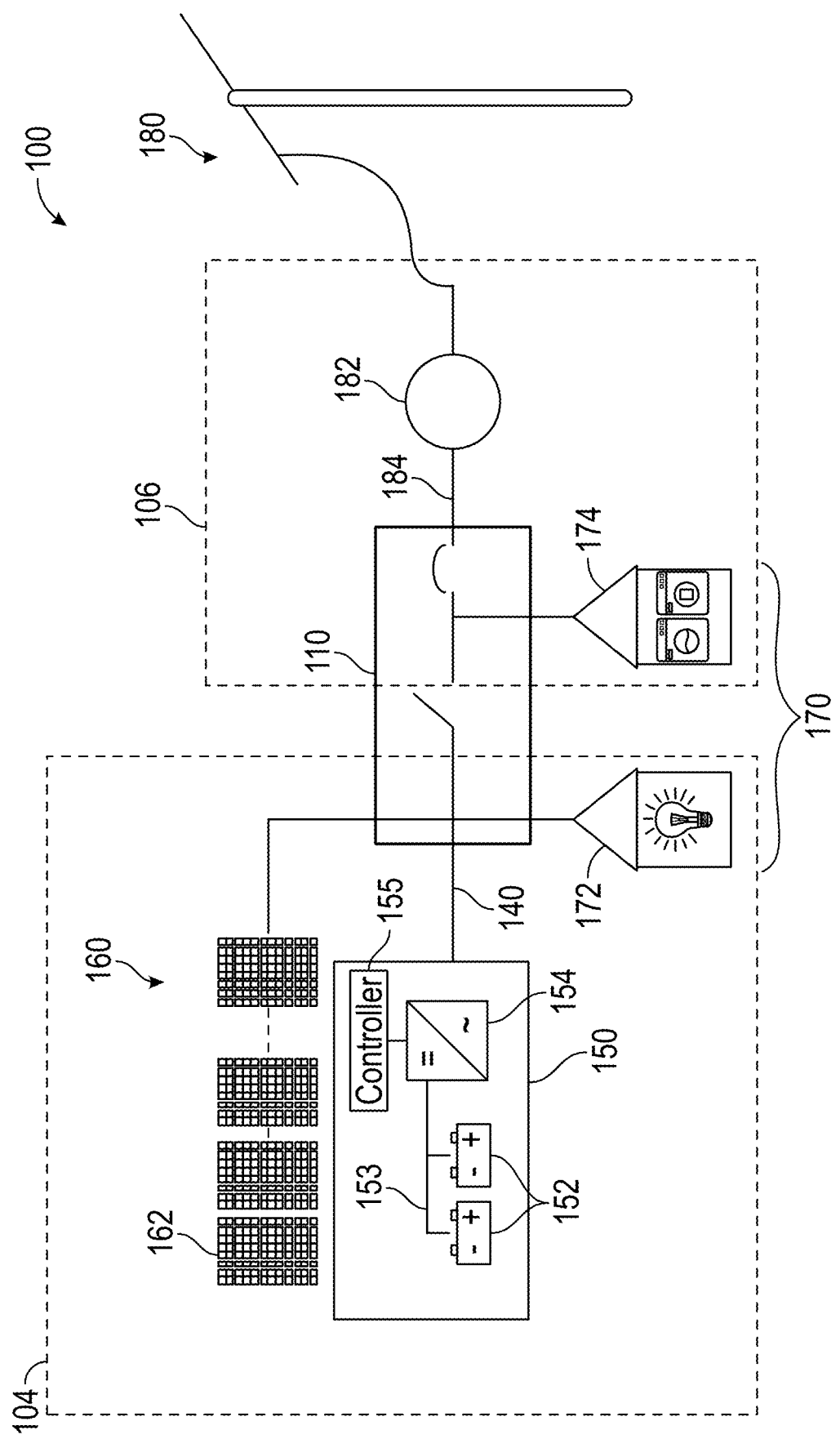
FIG. 1 illustrates an electrical system according to an embodiment.

The features and advantages of the embodiments will become more apparent from the detail description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," "certain embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" or "substantially" or "approximately" as used herein refer to a considerable degree or extent. When used in conjunction with, for example, an event, circumstance, characteristic, or property, the term "about" or "substantially" or "approximately" can indicate a value of a given quantity that varies within, for example, 1-15% of the value (e.g., ±1%, ±2%, ±5%, ±10%, or ±15% of the value), such as accounting for typical tolerance levels or variability of the embodiments described herein.

The terms "upstream" and "downstream" as used herein refer to the location of a component of the electrical system with respect to the direction of current or power supply. For example, a first component is located "upstream" of a second component when current is being supplied from the first component to the second component, and a first component is located "downstream" of a second component when current is being supplied from the second component to the first component.

The terms "micro-grid," "backup mode," and "off-grid" as used herein refer to group of interconnected loads (e.g., plurality of backup loads) and power distribution resources (e.g., backup PV power generation system, energy storage system, and energy control system) that function as a single controllable power network independent to the utility grid.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

When existing backup power supply systems, for example, for commercial buildings or residential homes, operate in microgrid formation, the controller of the backup system typically relies on the use of energy storage devices to store energy when PV power output exceeds load demand and to provide energy when PV power output cannot match load demand. However, PV power generation systems with large output capacities (e.g., 10 KW or higher) often supply more power than the energy storage system can absorb, thereby over-generating and disrupting the operability of the batteries in the storage system.

In addition, typical single backup power supply systems usually do not meet the load demands of particular loads (e.g., 50 amps or greater, such as an air conditioner, an electric vehicle charger, a pool pump, etc.) during the backup mode due to the limited storage capacity of the energy storage system. Accordingly, these large loads are typically installed on the non-backup side of the electrical system to avoid overload or reduce the load demand of the backup power supply system. Moving large loads on the non-backup side, however, typically requires using specific types of breakers or integrating new load subpanels, rendering the installation process cumbersome and expensive.

Thus, there is a need for systems and procedures that proactively curtail PV power output during the backup mode so that the energy storage system can absorb PV power output at all times in a smooth and reliable operation. And there is a need for systems and procedures that allow large loads to be electrically coupled to the backup side of an electrical system without overloading or draining backup power supply during the backup mode.

According to embodiments described herein, the electrical systems of the present disclosure can overcome one or more of these deficiencies, for example, by providing a storage converter configured to adjust a frequency of the power supplied to the backup side of the energy control system to a predetermined setpoint frequency that curtails PV power output dynamically when detecting that the energy control system switches from the on-grid mode to the backup mode. By automatically setting the frequency of the power supplied to the backup side of the energy control system to the setpoint frequency when the energy control system switches to the backup mode, the storage converter can permanently and promptly (e.g., within 5 minutes or less) curtail the PV power output such that the PV power output matches the absorption/charge capacity of the energy storage system.

Additionally, according to embodiments described herein, the electrical systems of the present disclosure can include an autonomous smart load breaker electrically coupled to the first backup load and configured to keep the first (e.g., large) backup load electrically connected to the energy control system when the energy control system is in the on-grid mode and to electrically disconnect the first (e.g., large) load from the energy control system when energy system is in the backup mode. In some embodiments, the autonomous smart load breaker can automatically detect a switch from the on-grid mode to the backup mode by monitoring the AC frequency of power supplied to the first (e.g., large) backup load. By automatically disconnecting the first (e.g., large) backup load when the electrical system switches to the backup mode, the autonomous smart loader breaker can allow larger loads, such as, for example, an air conditioner, an over range, electrical vehicle, etc. to be electrically coupled to the backup side of a microgrid interconnection device without posing a risk of AC overload or fast draining of the energy storage system during the backup mode.

Figure 2:
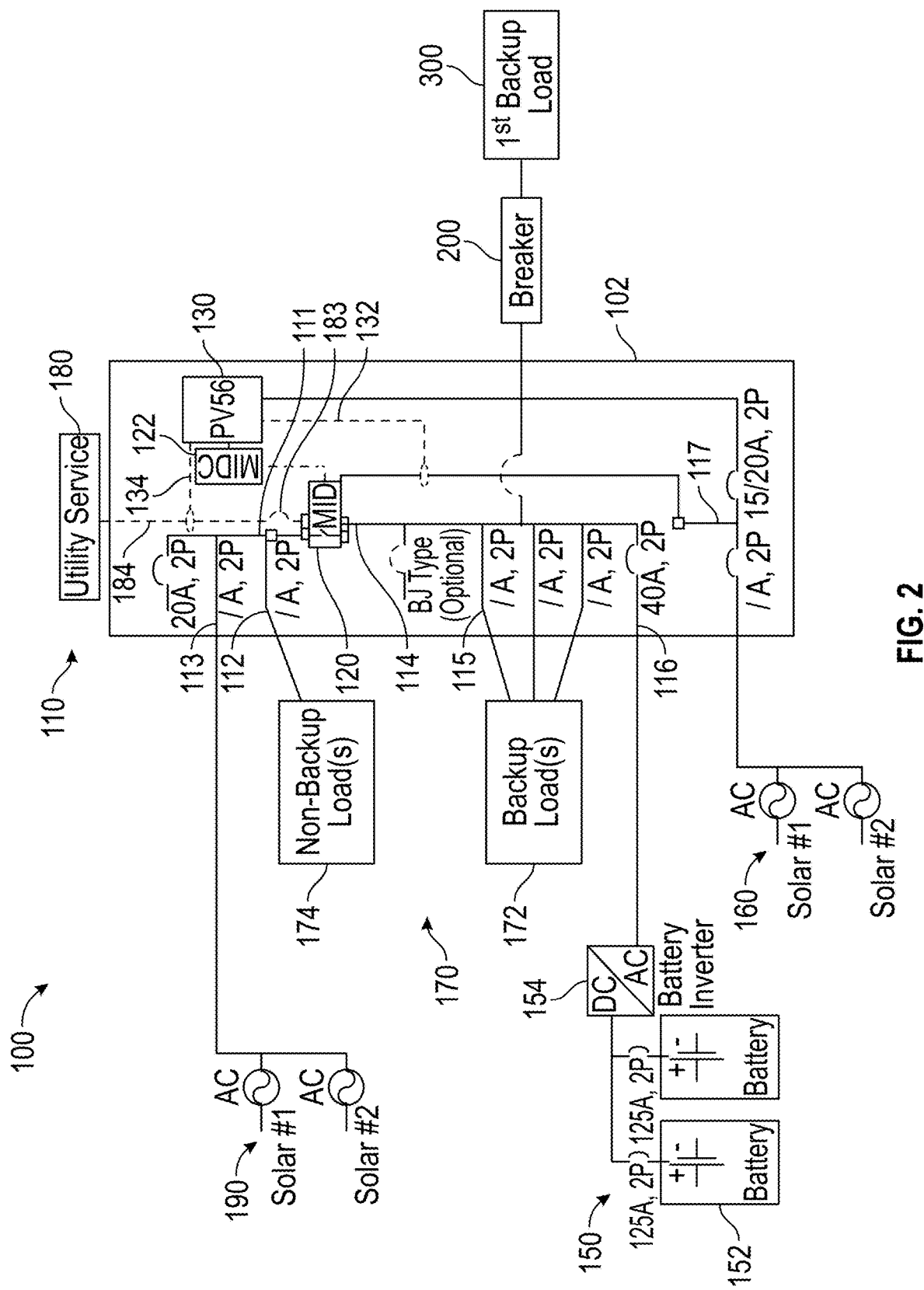
FIG. 2 illustrates an electrical system according to an embodiment.

FIGS. 1 and 2 show an energy control system 110 for controlling the operation of an electrical system 100 according to some embodiments. Electrical system 100 can include, for example, an energy storage system 150, a backup photovoltaic ("PV") power system 160, a plurality of electrical loads 170, a connection (e.g., a power bus with a subpanel and/or meter 182) to a utility grid 180, and/or a non-backup PV power generation system (e.g., non-backup PV power generation system 190 shown in FIG. 2). In some embodiments, energy control system 110 can control the power distribution between energy storage system 150, backup PV power generation system 160, the plurality of electrical loads 170, the connection to the utility grid 180, and/or non-backup PV power generation system 190. In some embodiments, energy control system 110 and electrical system 100 can include any component or be operated in any way, as disclosed in U.S. application Ser. No. 16/811,832, filed Mar. 6, 2020, titled "ENERGY CONTROL SYSTEM," the entirety of which is incorporated herein by reference. In some embodiments, energy storage system 150, backup PV power generation system 160, and/or at least one of the electrical loads 170 (e.g., plurality of backup loads 172) can be located on a backup side 104 of energy control system 110 such that energy control system 110, energy storage system 150, backup PV power generation system 160, and/or at least one of the electrical loads 170 (e.g., plurality of backup loads 172) can be configured as a single controllable power network independent to utility grid 180. In some embodiments, utility grid 180 and/or non-backup PV power generation system 190 is electrically coupled to a non-backup side 106 of energy control system 110.

Figure 7:
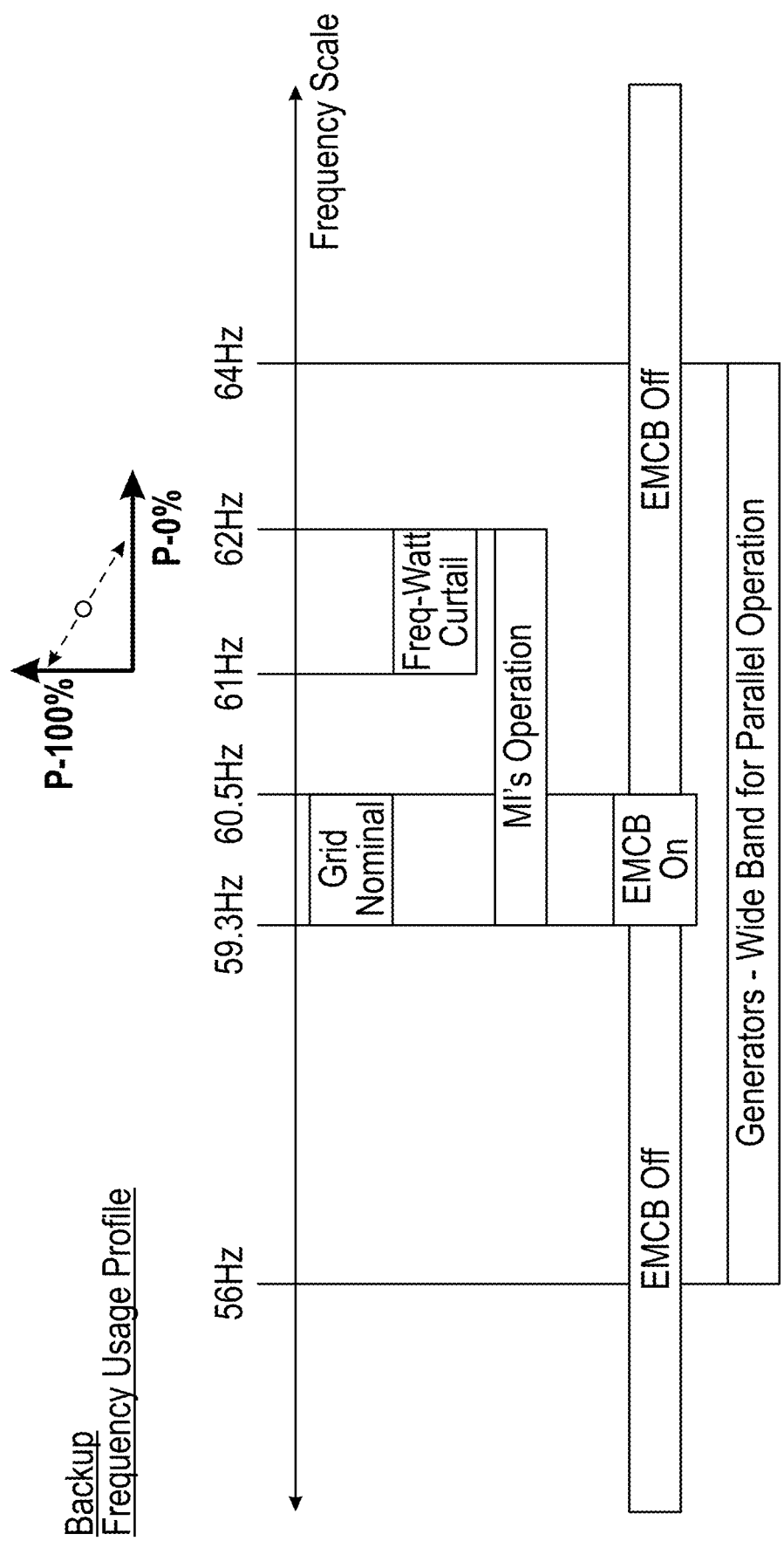
FIG. 7 illustrates a chart showing a frequency profile of an electrical system during the backup mode according to an embodiment.

In some embodiments, energy storage system 150 can include one or more batteries 152 configured to store electrical energy generated by backup PV power generation system 160. In some embodiments, energy storage system 150 can include a storage converter 154 (e.g., an inverter) electrically coupled to the batteries 152 by a direct current (DC) bus 153 and electrically coupled to energy control system 110 by an alternating current (AC) bus 140. In some embodiments, storage converter 154 can be configured to convert the DC current discharged from batteries 152 to an AC current that emulates power characteristics (e.g., voltage magnitude and frequency) of utility grid 180, such as for example, split phase AC at 240V/120V. In some embodiments, storage converter 154 can be configured to covert AC to DC. In some embodiments, storage converter 154 can be configured to adjust a charging rate and/or a discharging rate of the one or more batteries 152. In some embodiments, storage converter 154 can be configured to adjust the frequency of power (e.g., AC voltage) supplied to backup side 104 (e.g., the frequency of microgrid) of energy control system 110. In some embodiments, storage converter 154 can be configured to adjust the frequency of power supplied from energy storage system 150 to energy control system 110. In some embodiments, storage converter 154 can be configured adjust the frequency of power supplied by backup PV power generation system 160. In some embodiments, as shown in FIG. 7, storage converter 154 (e.g., a micro-inverter) can configured to adjust frequency of the electrical energy supplied by backup PV power generation system 160 in an operating range from approximately 56 Hz to approximately 64 Hz, such as, for example, approximately 59.3 Hz to approximately 62 Hz (micro-inverter's operation).

In some embodiments, storage converter 154 can include a controller 155 having a processor configured to process input signals and send commands via output signals. In some embodiments, controller 155 can include memory for storing, for example, information about energy storage system 150, backup PV power generation system 160, non-backup PV power generation system 190, and/or energy control system 110. In some embodiments, controller 155 can include firmware stored in the memory of controller 155 for controlling operation of storage converter 154 and/or battery 152. In some embodiments, the firmware of controller 155 can include algorithms, including any of the algorithms described herein, that enable the controller 155 to process electronic data received from energy control system 110 and/or backup PV power generation system 160. In some embodiments, execution of the stored algorithms can allow controller 155 to detect frequency of power supplied by backup PV power generation system 160, charging/discharging rate of batteries 152, and/or state of charge of batteries 152. In some embodiments, execution of the firmware can allow the controller 155 to adjust charging/discharging rate of batteries 152 and/or adjust frequency of power supplied to the backup PV power generation system 160 based on the processed electronic data and/or detected measurements.

In some embodiments, backup PV power generation system 160 can include one or more power generation arrays (e.g., a photovoltaic panel array), and each power generation array can include one or more power generation units 162 (e.g., a photovoltaic panel) configured to generate electrical energy. In some embodiments, backup PV power generation system 160 can include one or more PV converters (e.g., a micro-inverter). In some embodiments, the PV converter can include any type of components (e.g., an inverter) such that the PV converter is configured to convert DC to AC or vice versa. In some embodiments, at least one PV converter can synchronize the phase of the power feed to split-phase AC that is compatible with the utility grid. In some embodiments, the PV converter can be a part of power generation unit 162. In some embodiments, one, two, three, four, or more power generation units can be interconnected to a single PV converter (e.g., a string inverter). In some embodiments, backup PV power generation system 160 can include one or more power optimizers such as, for example, DC power optimizers. In some embodiments, backup PV power generation system 160 can include a feed circuit configured to distribute power to the energy control system 110.

In some embodiments, the plurality of electrical loads 170 can be separated into backup load(s) 172 and non-backup load(s) 174. In some embodiments, a plurality of backup loads 172 include one or more essential loads that continue to receive power from the backup PV power generation system 160 and/or energy storage system 150 during a power grid outage, and a plurality of non-backup loads 174 includes one or more non-essential loads that do not receive power from the backup PV power generation system 160 and/or energy storage system 150 during a utility power outage. In the context of the present disclosure, an electrical load can be, for example, one or more devices or systems that consume electricity. In some embodiments, the plurality of electrical loads 170 can include all or some of the electrical devices associated with a building (e.g., a residential home). In some embodiments, the plurality of electrical loads 170 can include 240-volt loads. In some embodiments, the plurality of electrical loads 170 can include, for example, an electric range/oven, an air conditioner, a heater, a hot water system, a swimming pool pump, and/or a well pump. In some embodiments, the plurality of electrical loads 170 can include 120-volt loads. In some embodiments, the plurality of electrical loads 170 can include, for example, power outlets, lighting, networking and automation systems, a refrigerator, a garbage disposal unit, a dishwasher, a washing machine, other appliance, a septic pump, electric vehicle charger, and/or an irrigation system.

In some embodiments, non-backup PV power generation system 190 can include one or more power generation arrays (e.g., a photovoltaic panel array), and each power generation array can include one or more power generation units (e.g., a photovoltaic panel). In some embodiments, non-backup PV power generation system 190 can include one or more PV converters. In some embodiments, PV converter can include the features of any one of the converters described herein.

In some embodiments, energy control system 110 can include any number of interconnections to control the flow of energy between energy storage system 150, backup PV power generation system 160, the plurality of electrical loads 170, utility grid 180, and/or non-backup PV power generation system 190. For example, in some embodiments, energy control system 110 can include a grid interconnection 184 electrically coupled to a utility grid 180 so that grid power is distributed to energy control system 110. In some embodiments, grid interconnection 184 can include a main overcurrent protection device 183 that is electrically disposed between utility grid 180 and other components of energy control system 110. In some embodiments, energy control system 110 can include a non-backup power bus 111 (e.g., 125 A rating bus) having one or more non-backup load interconnections 112 electrically coupled to the plurality of non-backup loads 174 and a non-backup PV interconnection 113 electrically coupled to non-backup PV power generation system 190. In some embodiments, energy control system 110 can include a backup power bus 114 (e.g., 200 A rating bus) having one or more backup load interconnections 115 electrically coupled to the plurality of backup loads 172 and a storage interconnection 116 electrically coupled to energy storage system 150. In some embodiments, energy control system 110 can include a backup photovoltaic interconnection 117 (e.g., 125 A rating bus) electrically coupled to backup PV power generation system 160. In the context of the present disclosure, an interconnection includes any suitable electrical structure, such as a power bus, wiring, a panel, etc., configured to establish electrical communication between two sets of circuits. Any one of interconnections 112, 113, 115, 116, 117, and 184 can include an AC bus, a panel, a sub-panel, a circuit breaker, any type of conductor, or a combination thereof.

In some embodiments, energy control system 110 can include a microgrid interconnection device 120 (e.g., an automatic transfer or disconnect switch) electrically coupled to non-backup power bus 111 (e.g., located on a load side of microgrid interconnection device 120) and backup power bus 114 (e.g., located on a line side of microgrid interconnection device 120), such that microgrid interconnection device 120 is electrically coupled to non-backup load interconnection 112, non-backup PV interconnection 113, backup load interconnection 115, storage interconnection 116, and/or backup PV interconnection 117. In some embodiments, microgrid interconnection device 120 is electrically coupled (e.g., directly) to grid interconnection 184. In the context of the present disclosure, a microgrid interconnection device can be, for example, any device or system that is configured to automatically connect circuits, disconnect circuits, and/or switch one or more loads between power sources. In some embodiments, microgrid interconnection device 120 can include any combination of switches, relays, and/or circuits to selectively connect and disconnect respective interconnections 113, 115, 116, 117, and 184 electrically coupled to energy control system 110. In some embodiments, such switches can be automatic disconnect switches that are configured to automatically connect circuits and/or disconnect circuits. In some embodiments, such switches can be transfer switches that are configured to automatically switch one or more loads between power sources.

In some embodiments, microgrid interconnection device 120 can be configured to operate in an on-grid mode (e.g., closed), in which microgrid interconnection device 120 electrically connects the backup power bus 114 to both the non-backup power bus 111 and grid interconnection 184. In some embodiments, when operating in the on-grid mode, microgrid interconnection device 120 can be configured to distribute electrical energy received from utility grid 180 and/or non-backup PV power generation system 190 to backup loads 172. In some embodiments, when operating in the on-grid mode, microgrid interconnection device 120 can be configured to distribute electrical energy received from energy storage system 150 and/or backup PV power generation system 160 to non-backup loads 174 and/or utility grid 180.

In some embodiments, microgrid interconnection device 120 can be configured to operate in a backup mode, in which microgrid interconnection device 120 electrically disconnects both non-backup power bus 111 and grid interconnection 184 from backup power bus 114 and backup PV interconnection 117. In some embodiments, when operating in the backup mode, microgrid interconnection device 120 can disrupt electrical connection from non-backup PV power generation system 190 from reaching backup loads 172. In some embodiments, when operating in the backup mode, microgrid interconnection device 120 can disrupt electrical connection between backup loads 172 and utility grid 180. In some embodiments, when operating in the backup mode, microgrid interconnection device 120 can disrupt electrical connection from energy storage system 150 and/or backup PV power generation system 160 to non-backup loads 174 and/or utility grid 180.

In some embodiments, energy control system 110 can include a controller 122 in communication with microgrid interconnection device 120 and configured to control the distribution of electrical energy between energy storage system 150, backup PV power generation system 160, the plurality of electrical loads 170, utility grid 180, and/or non-backup PV power generation system 190. In some embodiments, controller 122 can be configured to detect the status (e.g., power outage or voltage restoration) of grid interconnection 184 and switch microgrid interconnection device 120 between the on-grid mode and the backup mode based on the status of grid interconnection 184. If the status of grid interconnection 184 indicates a power outage, controller 122 can be configured to switch microgrid interconnection device 120 to the backup mode. If the status of grid interconnection 184 indicates a voltage restoration, controller 122 can be configured to switch microgrid interconnection device 120 to the on-grid mode.

In some embodiments, energy control system 110 includes a PV monitoring system 130. In some embodiments, PV monitoring system 130 includes a communication interface (e.g., one or more antennas) for sending and/or receiving data over a wireless network. In some embodiments, energy control system 110 includes one or more load meters that monitor the current or voltage through certain elements of electrical system 100 and transmit data indicating the monitored current or voltage to PV monitoring system 130 and controller 122. For example, a load meter can monitor the flow of electricity from microgrid interconnection device 120 to backup load interconnection 115. A load meter can monitor the flow of electricity from microgrid interconnection device 120 to backup PV interconnection 117 and non-backup PV interconnection 113. A load meter can monitor the flow of electricity from utility grid 180 to microgrid interconnection device 120.

In some embodiments, PV monitoring system 130 can include a site consumption current transformer 132 (site CT) for monitoring the quantity of energy consumption by the plurality of electrical loads 170. In some embodiments, site CT 132 can be operatively connected to grid interconnection 184. In some embodiments, PV monitoring system 130 can include a PV production CT 134 for monitoring the quantity of PV energy outputted from backup PV power generation system 160. In some embodiments, PV production CT 134 can be operatively linked to backup PV interconnection 117.

In some embodiments, PV monitoring system 130 can read timeseries data and/or disable a reconnection timer of backup PV power generation system 160 and/or non-backup PV power generation system 190. In some embodiments, PV monitoring system 130 can initiate a grid reconnection timer of backup PV power generation system 160. In some embodiments, PV monitoring system 130 can communicate with a battery monitoring system ("BMS") of energy storage system 150. In some embodiments, PV monitoring system 130 can communicate with energy storage system 150 and can, for example, read timeseries data, read power information, write charge/discharge targets, and/or write "heartbeats." In some embodiments, PV monitoring system 130 can receive status and/or power information from microgrid interconnection device 120.

In some embodiments, controller 122 can be linked (e.g., wired or wirelessly) to PV monitoring system 130 such that controller 122 receives electronic data related to backup PV power generation system 160 and/or non-backup PV power generation system 190 from PV monitoring system 130. In some embodiments, controller 122 can transmit commands to PV monitoring system 130 to adjust (e.g., increase or decrease) power output of backup PV power generation system 160 and/or non-backup PV power generation system 190 based on received data. In some embodiments, controller 122 can be configured as a master controller and PV monitoring system 130 can be configured to communicate electronic data (e.g., status of power generation) with controller 122 such that controller 122 controls control energy distribution based on the electronic data transmitted by PV monitoring system 130.

In some embodiments, controller 122 can receive and transmit electronic data (e.g., computer-processable data and/or information represented by an analog or digital signal) over a network, such as, for example, Wireless Local Area Network ("WLAN"), Campus Area Network ("CAN"), Metropolitan Area Network ("MAN"), or Wide Area Network ("WAN"), with components of energy storage system 150, backup PV power generation system 160, non-backup PV power generation system 190, a user's device (e.g., user's smartphone or personal computer), smart device (e.g., load meter) and/or smart appliances (e.g., smart outlets, smart plugs, smart bulbs, smart washers, smart refrigerators). In some embodiments, electronic data can include timeseries data, alerts, metadata, outage reports, power consumption information, backup power output information, service codes, runtime data, etc.

In some embodiments, controller 122 can receive electronic data (e.g., from a load meter) related to load consumption of the plurality of electrical loads 170, including backup loads 172 and/or non-backup loads 174. In some embodiments, electronic data related to the plurality of electrical loads 170 can include information regarding the amount of power consumed by the plurality of electrical loads 170 (including backup loads 172 and/or non-backup loads 174) and the times at which the power was consumed by the plurality of electrical loads 170. In some embodiments, controller 122 can use the collected electronic data to determine a load average per circuit and/or a load average per smart device corresponding to discrete blocks of time throughout the day. For example, time blocks can be broken down into 1-hour blocks, 2-hour blocks, 3-hour blocks, or other time blocks, including, for example, user-designated time blocks (e.g., times when the user may be asleep, at home, or out of the house). In some embodiments, controller 122 can use the collected data to determine an energy demand based on the amount of power consumed by the plurality of electrical loads 170.

Figure 5:
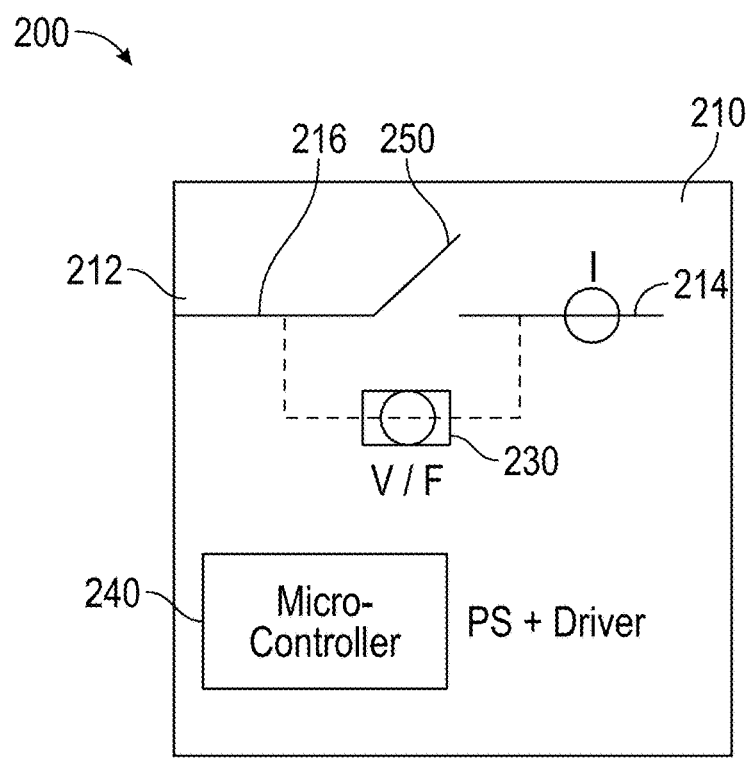
FIG. 5 illustrates an autonomous smart load breaker according to an embodiment.

In some embodiments, controller 122 can create a time-of-use library (e.g., a database or other structured set of data) that can define a circuit load average for each load and/or a smart device load average for each smart device with respect to the discrete blocks of time throughout the day. In some embodiments, controller 122 can use this information to determine which backup loads 172 receive power as a default during a grid power outage. In some embodiments, controller 122 can use this information to average load consumption by the plurality of backup loads 172 and/or non-backup loads 174 profiled over a day of time. For example, FIG. 5 illustrates a graph profiling the average load consumption by the plurality of backup loads 172 over a day. In some embodiments, controller 122 can use this information to predict the load demand by plurality of backup loads 172 and/or non-backup loads 174. In some embodiments, the controller 122 can use the average load demand by the plurality of backup loads 172 and/or non-backup loads 174 to be the predicted load demand.

In some embodiments, the converter of backup PV power generation system 160 can transmit to controller 122 electronic data related to backup PV power generation system 160. In some embodiments, electronic data related to backup PV power generation system 160 can include a current (e.g., an instantaneous) power output of backup PV power generation system 160. In some embodiments, electronic data related to backup PV power generation system 160 can include historical power output measurements of backup PV power generation system 160 recorded over an extended period of time (e.g., days, weeks, months). In some embodiments, electronic data related to backup PV power generation system 160 can include the average power output of the backup PV power generation system 160, for example, profiled over a day. For example, FIG. 5 illustrates a profile of the average power output of the backup PV power generation system 160 over a day. In some embodiments, controller 122 can calculate a predicted power output of backup PV power generation system 160 based on the historical data and other information, such as, for example, weather forecasts and state of the power generation arrays (e.g., power output capacity). In some embodiments, controller 122 uses the average power output of the backup PV power generation system 160 as a predicted power output for controlling operations of electrical system 100.

In some embodiments, storage converter 154 of energy storage system 150 can transmit to controller 122 electronic data related to energy storage system 150. In some embodiments, electronic data related to energy storage system 150 can include information relating to the amount of energy currently stored in energy storage system 150 (e.g., a current state of charge) and/or the amount of energy that energy storage system 150 is capable of absorbing (e.g., via charging). In some embodiments, electronic data related to energy storage system 150 can include the amount of energy being discharged (e.g., current discharging rate and/or the duration of the battery discharging) or predicted to be discharged (e.g., based on a time-of-use library) from energy storage system 150.

In some embodiments, electrical components (e.g., interconnections, switches, relays, AC bus) of energy control system 110 can be integrated into a single housing. For example, as shown in FIG. 2, in some embodiments, energy control system 110 can include a housing 102. In some embodiments, electrical components (e.g., interconnections, switches, relays, AC bus) of energy control system 110 can be disposed in multiple housings, such as for, example, a panel disposed in a home building and a subpanel disposed in a garage or pool house.

Figure 3:
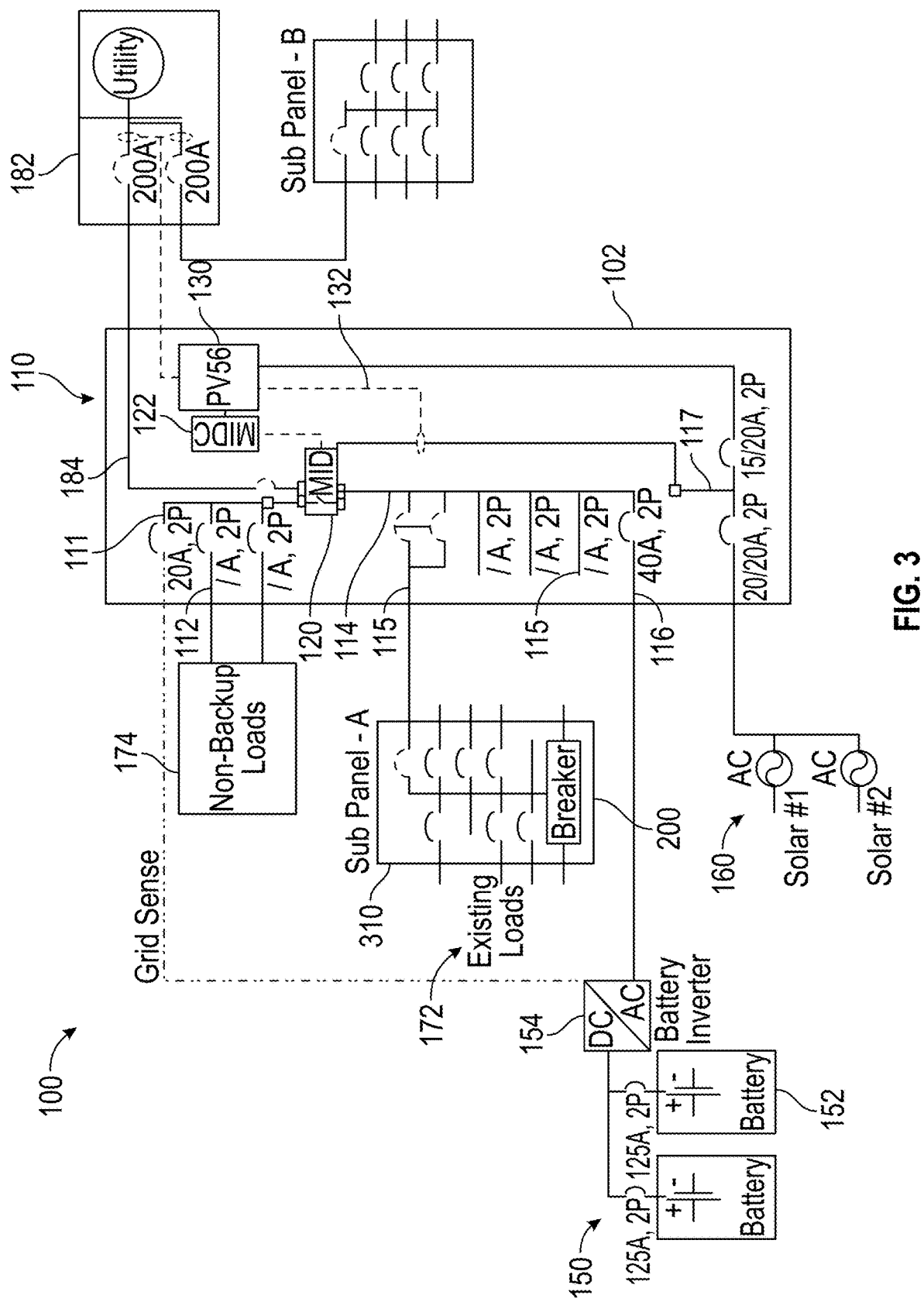
FIG. 3 illustrates an electrical system according to an embodiment.

In some embodiments, electrical system 100 can include an autonomous smart load breaker 200 electrically coupled to one of the backup loads 172, such as, for example, a first backup load 300 shown in FIG. 2. In some embodiments, first backup load 300 is a large load (e.g., 50 amps or greater) that is intended to be disconnected from the energy control system 110 during the backup mode to prevent unwanted power drainage of the energy storage system 150. For example, in some embodiments, a large electrical load as used herein can refer to a component configured to receive power from 50 amp current source and/or configured to consume 2000 or more watts. In some embodiments, as shown in FIG. 3, for example, autonomous smart load breaker 200 can be disposed in an existing subpanel 310 disposed on the backup side 104 of microgrid interconnection device 120. In some embodiments, autonomous smart load breaker 200 can be disposed upstream of an existing load breaker, providing universality compatibility with existing backup loads 172. In some embodiments, electrical system 100 can include multiple autonomous smart load breakers 200 that are each electrically coupled to a respective backup load 172.

In some embodiments, as shown for example in FIG. 2, autonomous smart load breaker 200 can be configured to detect an electrical characteristic (e.g., voltage, current, and/or frequency) of the electrical energy distributed from energy control system 110 to the first backup load 300. In some embodiments, autonomous smart load breaker 200 can be configured to electrically disconnect first backup load 300 from energy control system 110 based on processing of the detected electrical characteristic, so that first backup load 300 does not overload or fast drain the energy storage system 150. In some embodiments, autonomous smart load breaker 200 can be configured to disrupt the electrical connection within a predetermined time period (e.g., a response time in a range between approximately 10 milliseconds and approximately 40 milliseconds) that is compliant with state or national codes and product standards. Accordingly, in some embodiments, autonomous smart load breaker 200 can allow large loads that are not intended to be operated during the backup mode to be connected to the backup side 104 of the microgrid interconnection device 120 without the risk of overload or draining the energy storage system 150. By keeping large loads on the backup side 104 of microgrid interconnection device 120, autonomous smart load breaker 200 can save users cost and simplify installation of energy control system 110 by not having to move large loads to the non-backup side 104 of the microgrid interconnection device 120.

In some embodiments, autonomous smart load breaker 200 can be configured to monitor the frequency of the AC voltage transmitted to first backup load 300 and to disconnect first backup load 300 based on the monitored frequency. In some embodiments, autonomous smart load breaker 200 can be configured to disconnect first backup load 300 when monitored frequency exceeds a frequency deviation threshold (e.g., in a range from approximately 0.1 Hz to approximately 5 Hz, such as, for example, 0.5 Hz). In some embodiments, autonomous smart load breaker 200 can be configured to electrically connect the first backup load 300 with energy control system 110 when the monitored frequency is in a first frequency range. In some embodiments, autonomous smart load breaker 200 can be configured to electrically disconnect first backup load 300 from first backup load 300 when the monitored frequency is outside the first frequency range. For example, as shown in FIG. 7, in some embodiments, the first frequency range can be from 59.3 Hz to 60.5 Hz (e.g., EMCB ON shown in FIG. 7), which emulates the frequency of power supplied by utility grid 180. Accordingly, in some embodiments, when energy control system 110 is maintaining a nominal grid frequency (e.g., 59.3 Hz to 60.5 Hz) of energy distribution that emulates grid current, autonomous smart load breaker 200 can maintain electrical connection between first backup load 300 and energy control system 110. In some embodiments, when the frequency of energy supply is outside of the first frequency range (e.g., EMCB OFF shown in FIG. 7), such as, for example, a frequency below 59.3 Hz or above 60.5 Hz, autonomous smart load breaker 200 can electrically disconnect the first backup load 300 from energy control system 110.

Figure 4:
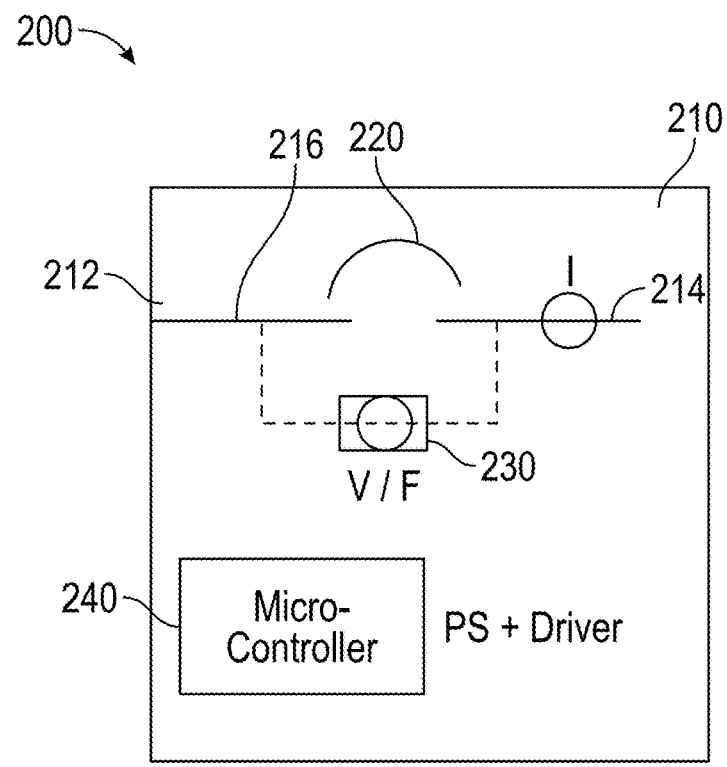
FIG. 4 illustrates an autonomous smart load breaker according to an embodiment.

In some embodiments, autonomous smart load breaker 200 can be configured as a smart breaker. For example, as shown in FIG. 4, autonomous smart load breaker 200 can include a printed circuit board (PCB) 210, a line side 212 electrically coupled to energy control system 110, and a load side 214 electrically coupled to first backup load 300. In some embodiments, autonomous smart load breaker can include a switch 220 disposed along a line conductor 216 that receives voltage and current from line side 212 and transmits to load side 214 to first backup load 300. In some embodiments, switch 220 can be configured to move between a closed position, in which current is allowed to flow from line side 212 to load side 214, and an open position, in which current is disrupted between line side 212 and load side 214.

In some embodiments, autonomous smart load breaker 200 can include sensor circuitry 230 (e.g., a standard resistor chain and signal filter) disposed on PCB 210. In some embodiments, sensor circuitry 230 can be configured to measure voltage, current, and/or frequency across the line conductor 216. In some embodiments, sensor circuitry 230 can include any type of circuitry component (e.g., a voltmeter, resistor chain, signal filter, a potential transformer, and/or a current transformer), to measure voltage, current, and/or frequency across line conductor 216. In some embodiments, sensor circuitry 230 can be electrically coupled to first phase line, second phase line, neutral line, and/or ground line of the circuit coupled to first backup load 300 to measure voltage between first phase line, second phase line, and/or neutral line.

In some embodiments, autonomous smart load breaker 200 can include a microcontroller 240, for example, disposed on PCB 210, and operatively connected to switch 220 and/or sensor circuitry 230. In some embodiments, microcontroller 240 can be configured to receive measurements (e.g., voltage level, current, and/or frequency) from sensor circuitry 230. In some embodiments, microcontroller 240 can be configured to transmit drive signals to switch 220 to move between open and closed positions. In some embodiments, microcontroller 240 can be configured to transmit drive signals directly to switch 220. In some embodiments, microcontroller 240 can be configured to transmit drive signals to an actuator (e.g., solenoid, motor) to move the switch 220 between the open and closed positions. In some embodiments, microcontroller 240 can be configured to transmit through a driver a drive signal to switch 220 and/or actuator of switch 220 to actuate movement between the open and closed positions. In some embodiments, microcontroller 240 can include an analog-to-digital converter to convert analog signals received from sensor circuitry 230 to digital signals. In some embodiments, microcontroller 240 can include a processor for processing input signals and generating the drive signals.

In some embodiments, microcontroller 240 can include firmware for storing instructions and algorithms, including any of the algorithms described herein, that enable the microcontroller to process voltage, current, and/or frequency measurements from sensor circuitry 230. In some embodiments, execution of the stored algorithms can allow microcontroller 240 to detect peak voltage, current, and/or frequency and compare data to predetermined thresholds or operating ranges (e.g., first frequency range). In some embodiments, execution of the firmware can allow the microcontroller 240 to process measurements and actuate switch 220.

In some embodiments, as shown in FIG. 5, for example, autonomous smart load breaker 200 can be configured as an electromechanical relay (e.g., a switch device having a coil, an armature, and contactors). Similar to the embodiment shown in FIG. 4, autonomous smart load breaker 200 shown in FIG. 5 can include PCB 10, line side 212, load side 214, line conductor 216, sensor circuitry 230, and microcontroller 240. In some embodiments, autonomous smart load breaker 200 can include a relay 250, instead of a switch, electrically coupled to line conductor 216. In some embodiments, relay 250 can be configured to switch between a closed position to permit electrical connection between line side 212 and load side 214 and an open position to disrupt electrical connection between line side 212 and load side 214. In some embodiments, microcontroller 240 can be configured to transmit a drive signal to relay 250 to actuate relay 250 to switch between open and/or closed positions.

Figure 6:
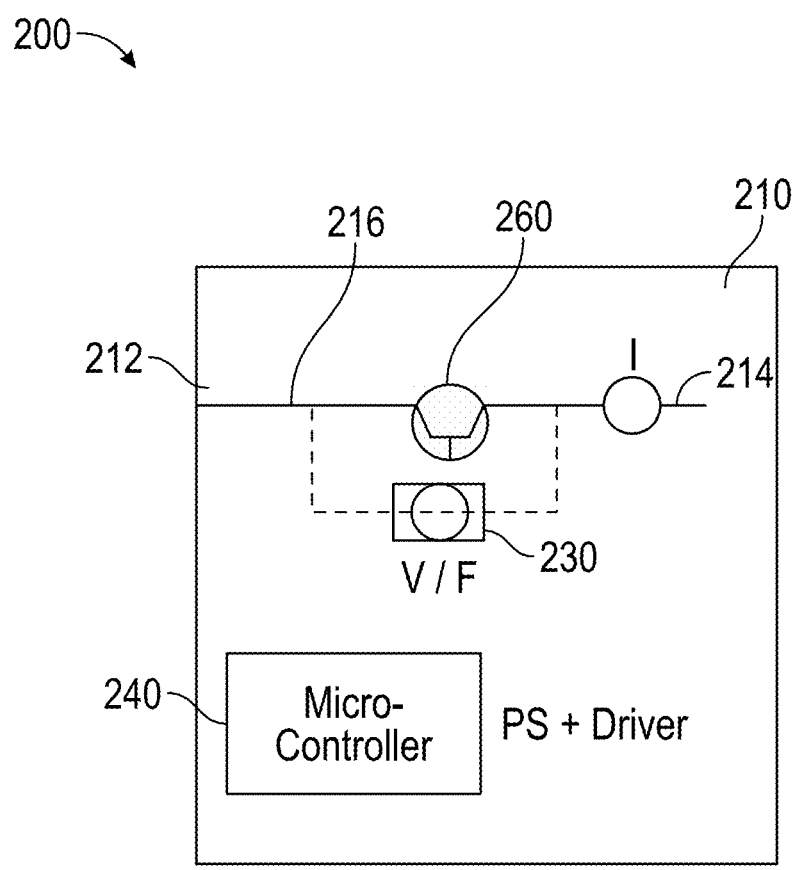
FIG. 6 illustrates an autonomous smart load breaker according to an embodiment.

In some embodiments, as shown in FIG. 6, for example, autonomous smart load breaker 200 can be configured as a solid-state relay (e.g., semiconductor device having a transistor or integrated-circuit). Similar to the embodiment shown in FIG. 4, autonomous smart load breaker 200 shown in FIG. 6 can include PCB 10, line side 212, load side 214, line conductor 216, sensor circuitry 230, and microcontroller 240. In some embodiments, autonomous smart load breaker 200 can include a transistor 260, instead of a switch, electrically coupled to line conductor 216. In some embodiments, transistor 260 can be configured to switch between a closed setting to permit electrical connection between line side 212 and load side 214 and an open setting to disrupt electrical connection between line side 212 and load side 214. In some embodiments, microcontroller 240 can be configured to transmit a drive signal to a gate of transistor 260 to actuate transistor 260 to switch between open and/or closed settings.

In some embodiments, storage converter 154 of energy storage system 150 can be configured to adjust the frequency of the power supplied to backup side 104 of energy control system 110 (e.g., the frequency of microgrid/backup side 104) to avoid overloading or the risk of power supply exceeding the absorption/charge capability of batteries 152. In some embodiments, as shown in FIG. 7, for example, storage converter 154 (e.g., micro-inverter) can be configured to maintain frequency of the power supplied by backup PV power generation system 160 in an operating range from approximately 56 Hz to approximately 64 Hz, such as, for example, 59.3 Hz to 62 Hz.

Figure 8:
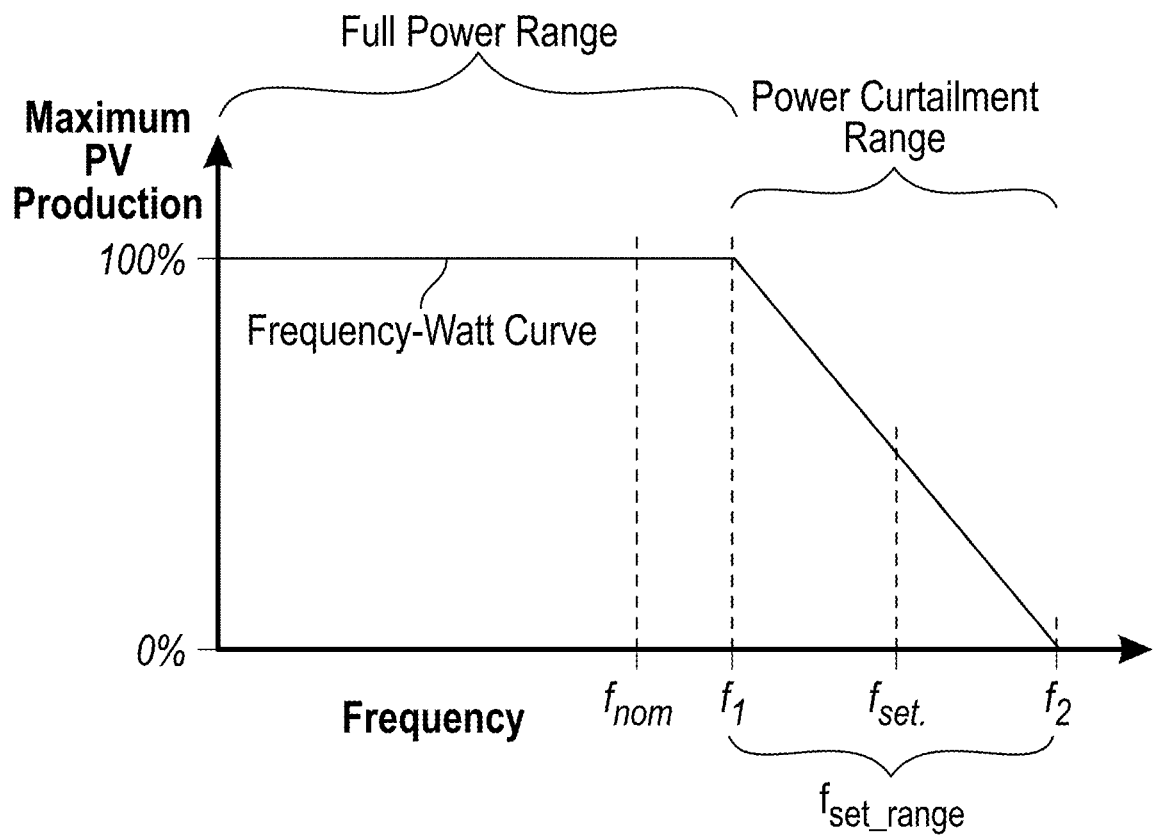
FIG. 8 illustrates a graph showing maximum power output of a backup PV power generation system with respect to frequency according to an embodiment.

In some embodiments, as shown in FIGS. 7 and 8, for example, storage converter 154 can be configured to adjust a frequency of the power supplied to backup side 104 of energy control system 110 in a first frequency range (e.g., $f_{nom}$-$f_1$) to allow a maximum PV power output. In some embodiments, the first frequency range can range from approximately 45 Hz to approximately 61 Hz, such as, for example, from 59.3 Hz to 60.5 Hz (e.g., Grid Nominal shown in FIG. 7) and/or from 49.3 Hz to 50.5 Hz. In some embodiments, storage converter 154 can be configured to maintain frequency of power supplied to backup side 104 of energy control system 110 at a nominal grid frequency that is compatible with utility grid 180, such as, for example, 60 Hz or 50 Hz.

In some embodiments, as shown in FIGS. 7 and 8, for example, storage converter 154 can be configured to adjust a frequency of the power supplied to backup side 104 of energy control system 110 in a second frequency range (e.g., $f_1$-$f_2$) to curtail PV power output. In some embodiments, the second frequency range can range from approximately 60.5 Hz to approximately 65 Hz, such as, for example, from approximately 60.5 Hz to approximately 62 Hz (e.g., Freq-Watt Curtail shown in FIG. 7). In some embodiments, storage converter 154 can be configured to maintain frequency of power supplied to backup side 104 of energy control system 110 at a setpoint frequency (e.g., 61.5 Hz) set in the second frequency range to curtail a predetermined percentage of backup PV power output.

In some embodiments, storage converter 154 can be configured to set frequency of power supplied to backup side 104 of energy control system 110 to a nominal grid frequency (e.g., 60 Hz) in the first frequency range when microgrid interconnection device 120 is in the on-grid mode, such that the backup PV power output emulates utility grid-tied operation. In some embodiments, storage converter 154 can be configured to receive electronic data indicating discharge rates and/or state of charge of batteries 152. In some embodiments, storage converters 154 can be configured to set the frequency of the power supplied to backup side 104 of energy control system 110 to the second range of frequencies to curtail backup PV power output when determining that discharge rates have fallen below a minimal discharge threshold (e.g., in a range from approximately 0.5 A to approximately 2 A, such as, for example, approximately 0.75 A) and/or when current state of charge has exceeded an upper state of charge threshold (e.g., in a range from approximately 3 A to approximately 7 A, such as, for example, approximately 5 A).

In some embodiments, storage converter 154 can be configured to detect when microgrid interconnection device 120 switches from the on-grid mode to the backup mode. In some embodiments, storage converter 154 can detect a switch from the on-grid mode to the backup mode by monitoring only the frequency of power supplied on backup side 104 of energy control system 110, without communicating with other components of electrical system 100. For example, in some embodiments, storage converter 154 can detect a switch from the on-grid mode to the backup mode when determining that the monitored frequency of the power supplied on backup side 104 of energy control system 110 is not equal to the nominal grid frequency (e.g., 60 Hz) and/or when the monitored frequency is outside the first frequency range (e.g., 59.3 Hz to 60.5 Hz).

In some embodiments, storage converters 154 can be configured to set the frequency of the power supplied to backup side 104 of energy control system 110 to the setpoint frequency in the second range of frequencies to curtail backup PV power output when detecting that microgrid interconnection device 120 switches from the on-grid mode to the backup mode. In some embodiments, the setpoint frequency can limit maximum PV power output to a PV power output that is the same as the maximum absorption rate of energy storage system 150. For example, if backup PV power generation system 160 is rated at a 10 kW peak capability, and storage converter 154 is rated at a 5 kW peak capability, then the setpoint frequency can be set to a value to curtail 50% of the maximum PV power output capability, which is limiting backup PV power output to 5 kW. In some embodiments, the second frequency range can be based on CPUC rule 21 compliant grid profile such that the second frequency ranges from approximately 60.036 Hz to approximately 60.236 Hz, thereby making the setpoint frequency set at 61.036 Hz. In some embodiments, the setpoint frequency can be based on other operation parameters.

In some embodiments, autonomous smart load breaker 200 can be configured to detect changes in the frequency of power supplied to first backup load 300 in response to storage converter 154 adjusting the frequency of power supplied by backup PV power generation system 160. In some embodiments, autonomous smart load breaker 200 can be configured to keep first backup load 300 electrically connected to the energy control system 110 when detecting that the frequency of the supplied power is in the first frequency range. In some embodiments, autonomous smart load breaker 200 can be configured to electrically disconnect first backup load 300 from the energy control system 110 when detecting that the frequency of the supplied power is in the second frequency range. Accordingly, in some embodiments, the operation of autonomous smart load breaker 200 can be synchronized with storage converter 154 adjusting the frequency of power supplied by backup PV power generation system 160.

Figure 9:
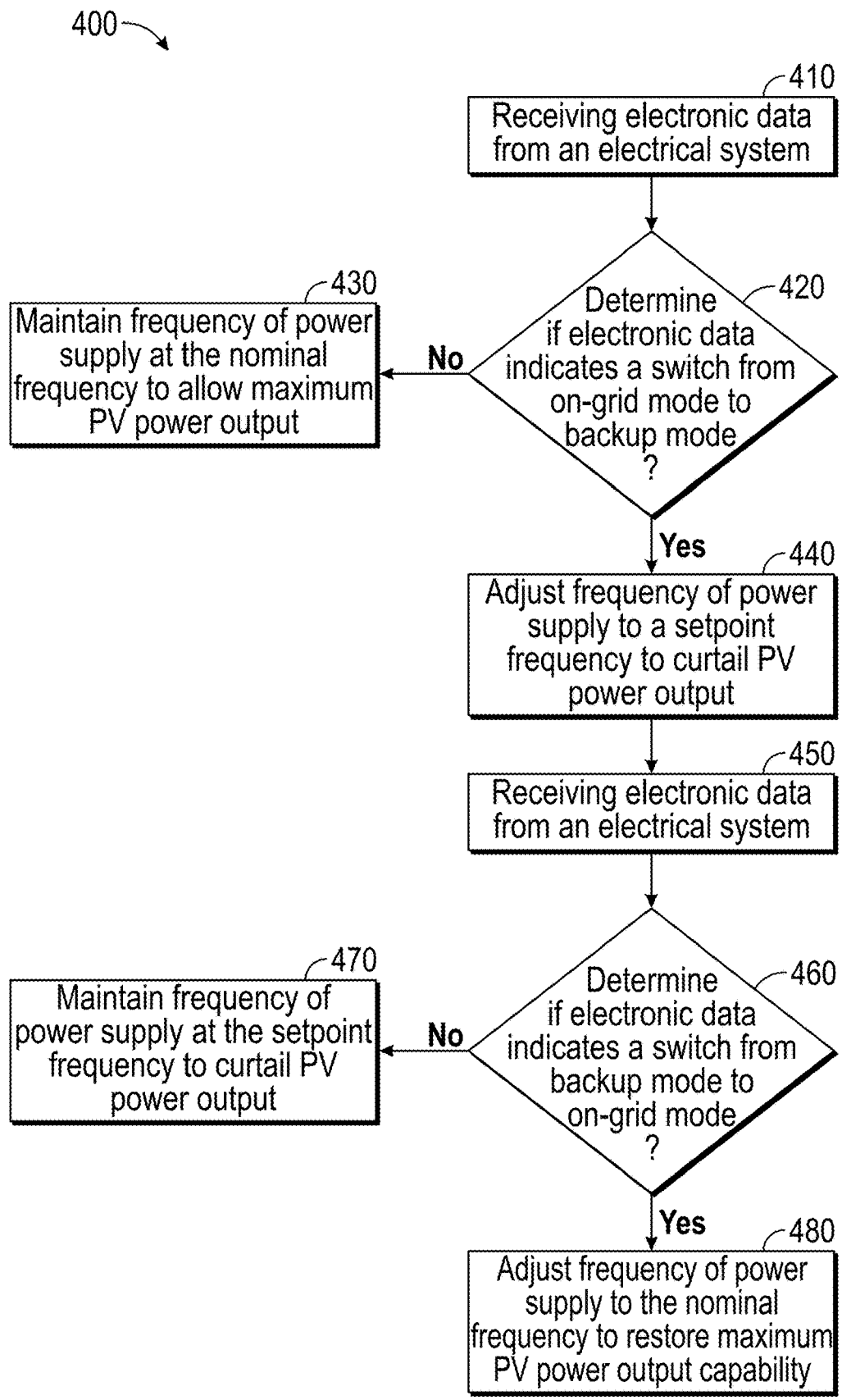
FIG. 9 illustrates a block diagram showing a method of controlling PV power output according to an embodiment.

FIG. 9 shows an example block diagram illustrating aspects of a method 400 of controlling electrical system 100, by a controller, such as, for example, controller 155 of storage converter 154. In some embodiments, method 400 can be executed by any controller in electrical system 100, such as, for example, a controller in a converter (e.g., inverter) located in the backup PV power generation system 160 and/or a controller in a converter located on the backup side 104 of energy control system 110 that is electrically coupled to energy storage system 150 and/or backup PV power generation system 160. One or more aspects of method 400 can be implemented using hardware, software modules, firmware, tangible computer readable media having instructions stored thereon, or a combination thereof and can be implemented in one or more computer systems or other processing systems.

In some embodiments, method 400 can include a step 410 of receiving electronic data from electrical system 100. In some embodiments, step 410 can include monitoring (e.g., by controller 155 of the storage converter 154) the frequency of the power supplied on backup side 104 of energy control system 110. In some embodiments, step 410 can include receiving electronic data from controller 122 indicating the status of microgrid interconnection device 120. In some embodiments, step 410 can include monitoring the load demand and/or the frequency of power supplied to storage converter 154. In some embodiments, step 410 can include receiving an operation status of utility grid 180.

In some embodiments, method 400 can include a step 420 of determining whether the electronic data indicates that energy control system 110 has switched from the on-grid mode to the backup mode. In some embodiments, step 420 can include detecting that microgrid interconnection device 120 has switched from the on-grid mode to the backup mode. In some embodiments, step 420 can include determining whether microgrid interconnection device 120 has switched to the backup mode based only on the monitored frequency of the power supplied on backup side 104 of energy control system 110. For example, in some embodiments, step 420 can include determining that microgrid interconnection device 120 has switched to the backup mode when the monitored frequency of the supplied power is not equal to the nominal grid frequency (e.g., 60 Hz) and/or when the monitored frequency is outside the first frequency range (e.g., 59.3 Hz to 60.5 Hz). In some embodiments, step 420 can include determining that the load demand has dropped below a load demand threshold. In some embodiments, the load demand threshold corresponds to the maximum load demand by the plurality of backup loads 172.

In some embodiments, method 400 can include a step 430 of maintaining frequency of power supplied by backup PV power generation system 160 at the nominal grid frequency when determining that microgrid interconnection device 120 remains in the on-grid mode. In some embodiments, step 430 includes maintaining the power supply at the first power output.

In some embodiments, method 400 can include a step 440 of adjusting the frequency of power supplied by backup PV power generation system 160 to the setpoint frequency when determining that energy control system 110 has switched from the on-grid mode to the backup mode. In some embodiments, the setpoint frequency is greater than the nominal grid frequency. In some embodiments, the nominal grid frequency is in the first frequency range, and the setpoint frequency is in the second frequency range. In some embodiments, the second frequency range can be set from approximately 60.1 Hz to approximately 65 Hz, such as, for example, from approximately 60.5 Hz to approximately 62 Hz. In some embodiments, the selection of the setpoint frequency can be based on the difference between the maximum PV power output and the absorption/charge capacity of energy storage system 150. In some embodiments, the supplied backup power set at the setpoint frequency is maintained at a second power output that is less than the first power output. In some embodiments, the second power output corresponds to a predetermined percentage of the maximum power output. In some embodiments, the predetermined percentage of the maximum power output is based on the difference between the maximum PV power output and the absorption/charge capacity of energy storage system 150. In some embodiments, the setpoint frequency can be the minimal frequency configured for reducing the PV power output to the predetermined percentage of the maximum power output. In some embodiments, the setpoint frequency can be determined algorithmically to curtail the predetermined percentage of the maximum power output. For example, in some embodiments, the setpoint frequency can be raised from a first setpoint frequency (e.g., 61 Hz) in the second frequency range to a second setpoint frequency (e.g., 61.5 Hz) in the second frequency range to reduce a greater percentage of the maximum power output. In some embodiments, the difference between the second setpoint frequency and the first setpoint frequency can be determined algorithmically by using the maximum power output of the backup PV power generation system 160 and the absorption capacity of energy storage system 150 as inputs.

In some embodiments, after setting the frequency of the power supplied by backup PV power generation system 160 to the setpoint frequency, method 400 can include a step 450 of receiving electronic data. In some embodiments, step 450 can include the same or similar processes as step 410. In some embodiments, method 400 can include a step 460 of determining whether the electronic data indicates that the microgrid interconnection device 120 has switched from the backup mode to the on-grid mode. In some embodiments, step 460 of determining whether microgrid interconnection device 120 has switched back to the on-grid mode can be based only on the monitored frequency of the power supplied to energy storage system 150. For example, in some embodiments, step 460 can include detecting when the monitored frequency of the supplied power is equal to the nominal grid frequency (e.g., 60 Hz) and/or when the monitored frequency is in the first frequency range (e.g., 59.3 Hz to 60.5 Hz). In some embodiments, step 460 can include the same or similar processes as step 420.

In some embodiments, when step 460 indicates that microgrid interconnection device is still set in the backup mode, method 400 can include a step 470 of maintaining the frequency of power supplied to backup side 104 of energy control system 110 at the setpoint frequency. In some embodiments, when step 460 indicates that microgrid interconnection device 120 has switched from the backup mode to the on-grid mode, method 400 can include a step 480 of (e.g., automatically) adjusting the frequency of power supplied to backup side 104 of energy control system 110 to the nominal grid frequency to restore maximum PV power output capability.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:
1. An electrical system, comprising:
an energy control system electrically coupled to a plurality of backup loads including a first backup load;
a photovoltaic (PV) power generation system electrically coupled to the energy control system, the PV power generation system configured to generate and supply power;
an energy storage system electrically coupled to the energy control system, the energy storage system configured to store power supplied by the PV power generation system and discharge stored power to the energy control system; and
an autonomous smart load breaker electrically coupled to the first backup load,
wherein the energy control system is configured to operate in an on-grid mode electrically connecting the PV power generation system to a utility grid and a backup mode electrically disconnecting the PV power generation system and the plurality of backup loads from the utility grid,
wherein the autonomous smart load breaker is configured to:
detect changes in a frequency of power supplied to the energy control system, wherein the frequency is adjusted by the energy storage system during discharge of the stored power to the first backup load;
connect the first backup load with the energy control system when the frequency is in a first frequency range to increase PV power output; and
disconnect the first backup load from the energy control system when the frequency is in a second frequency range to curtail PV power output.

2. The electrical system of claim 1, wherein the autonomous smart load breaker comprises a switch and a microcontroller configured to operate the switch.

3. The electrical system of claim 1, wherein the autonomous smart load breaker comprises an electro-mechanical relay.

4. The electrical system of claim 1, wherein the autonomous smart load breaker comprises a solid-state switch.

5. The electrical system of claim 1, wherein the autonomous smart load breaker comprises measurement circuitry configured to detect at least one of voltage and current, and the autonomous smart load breaker is configured to determine whether to disconnect the first backup load from the energy control system based on the detected voltage or current.

6. The electrical system of claim 1, wherein the first frequency range emulates frequency of power supplied by a utility grid to increase PV power output.

7. The electrical system of claim 1, wherein the second frequency range is different from the first frequency range to curtail PV power output.

8. An electrical system comprising:
an energy control system configured to operate in an on-grid mode electrically connecting a PV power generation system to a utility grid and a backup mode electrically disconnecting the PV power generation system and a plurality of backup loads from the utility grid;
an autonomous smart load breaker comprising a microcontroller configured to:
detect changes in a frequency of power supplied to the energy control system, wherein the frequency is adjusted by an energy storage system during discharge of stored power to a first backup load of the plurality of backup loads;

connect the first backup load with the energy control system when the frequency is in a first frequency range to increase photovoltaic (PV) power output; and disconnect the first backup load from the energy control system when the frequency is in a second frequency range to curtail PV power output.

9. The autonomous smart load breaker of claim 8, further comprising a switch, wherein a microcontroller of the microcontroller is configured to operate the switch.

10. The autonomous smart load breaker of claim 8, further comprising an electro-mechanical relay.

11. The autonomous smart load breaker of claim 8, further comprising a solid-state switch.

12. The autonomous smart load breaker of claim 8, wherein the first frequency range emulates frequency of power supplied by the utility grid to increase PV power output.

13. The autonomous smart load breaker of claim 8, wherein the second frequency range is different from the first frequency range to curtail PV power output.

14. The autonomous smart load breaker of claim 8, further comprising measurement circuitry configured to detect at least one of voltage and current, wherein the autonomous smart load breaker is configured to determine whether to disconnect the first backup load from the energy control system based on the detected voltage or current.

15. A computer-implemented method comprising under control of an energy control system configured to execute specific steps:
   operating in an on-grid mode electrically connecting a PV power generation system to a utility grid; and
   operating in a backup mode electrically disconnecting the PV power generation system and a plurality of backup loads from the utility grid;
   under control of a microcontroller associated with an autonomous smart load breaker, the microcontroller configured to execute specific steps:
      detecting changes in a frequency of power supplied to an energy control system, wherein the frequency is adjusted by an energy storage system during discharge of stored power to a first backup load of the plurality of backup loads;
      connecting the first backup load with the energy control system when the frequency is in a first frequency range to increase photovoltaic (PV) power output; and
      disconnecting the first backup load from the energy control system when the frequency is in a second frequency range to curtail PV power output.

16. The computer-implemented method of claim 15, further comprising operating a switch of the autonomous smart load breaker.

17. The computer-implemented method of claim 15, wherein connecting the first backup load with the energy control system when the frequency is in a first frequency range to increase PV power output further comprises connecting the first backup load with the energy control system when the frequency is in the first frequency range that emulates frequency of power supplied by a utility grid to increase PV power output.

18. The computer-implemented method of claim 15, wherein disconnecting the first backup load from the energy control system when the frequency is in a second frequency range to curtail PV power output further comprises disconnecting the first backup load from the energy control system when the frequency is in the second frequency range that is different from the first frequency range to curtail PV power output.

19. The computer-implemented method of claim 15, further comprising disrupting an electrical connection between the energy control system and the first backup load within a predetermined time period.

20. The computer-implemented method of claim 19, wherein disrupting the electrical connection between the energy control system and the first backup load within the predetermined time period further comprises disrupting the electrical connection within a response time in a range between approximately 10 milliseconds and approximately 40 milliseconds.

* * * * *